United States Patent

Hagarty et al.

[11] Patent Number: 4,779,692
[45] Date of Patent: Oct. 25, 1988

[54] BATTERY ENCLOSURE SYSTEM FOR TRACTORS

[75] Inventors: Jon R. Hagarty, Darien; Alfred J. Joscher, Lombard, both of Ill.

[73] Assignee: J. I. Case Company, Racine, Wis.

[21] Appl. No.: 99,300

[22] Filed: Sep. 17, 1987

[51] Int. Cl.⁴ .................................................. B60R 27/00
[52] U.S. Cl. ........................... 180/68.5; 312/323; 105/51
[58] Field of Search ............... 180/68.5; 280/166; 312/322, 323; 105/51; 248/503; 429/96, 100

[56] References Cited

U.S. PATENT DOCUMENTS

| | | | |
|---|---|---|---|
| 1,091,583 | 3/1914 | MacGlashan | 180/68.5 |
| 1,678,033 | 7/1928 | Brumbaugh | 180/68.5 |
| 2,158,784 | 5/1939 | Dean | 180/68.5 |
| 2,607,433 | 8/1952 | Simi | 180/68.5 |
| 2,642,217 | 6/1953 | Jennings | 280/166 |
| 2,802,540 | 8/1957 | Brookbank | 180/68.5 |
| 3,003,573 | 10/1961 | Lorenz | 180/68.5 |
| 3,821,997 | 7/1974 | Sieren | 180/68.5 |
| 3,930,552 | 1/1976 | Kunkle et al. | 180/68.5 |
| 3,989,118 | 11/1976 | Hansen | 180/68.5 |
| 4,013,136 | 3/1977 | Fear | 180/68.5 |
| 4,074,786 | 2/1978 | Joubert | 180/68.5 |
| 4,314,734 | 2/1982 | Grunert | 312/323 |
| 4,368,455 | 1/1983 | Menard | 180/68.5 |
| 4,480,710 | 11/1984 | Hansen | 180/68.5 |
| 4,506,748 | 3/1985 | Thomas | 180/68.5 |
| 4,709,972 | 12/1987 | LaBudde et al. | 312/323 |

FOREIGN PATENT DOCUMENTS 573426 11/1945 United Kingdom ............... 180/68.5

Primary Examiner—John J. Love
Assistant Examiner—Brian L. Johnson
Attorney, Agent, or Firm—Peter N., Ltd. Jansson

[57] ABSTRACT

An improved tractor battery enclosure of the type having a service opening, including walls forming an enclosure, a suspended battery-support floor approximating the size of a battery base and movable between a battery use position and an at least partially offset position, and a door along the lead edge of the floor movable between a closed position and an open position coplanar with the floor, such that a battery may readily be moved with the floor and then along the floor to a full service position in which it is at least partially supported by the door.

10 Claims, 3 Drawing Sheets

//4,779,692

BATTERY ENCLOSURE SYSTEM FOR TRACTORS

FIELD OF THE INVENTION

This invention is related generally to means for mounting batteries on vehicles and, more particularly, to tractor battery enclosures of the type having special service openings.

BACKGROUND OF THE INVENTION

Batteries have been mounted in a variety of locations and in a variety of enclosures on tractors. The rearrangements and relocations of tractor battery mounts have been frequent and have been made for many different reasons.

There are usually a number of considerations in mind when determining where and how to mount vehicle batteries. Among these are: minimizing the extent of component crowding under the engine hood; allowing sufficient cooling such that the battery does not overheat; keeping the battery out of the way of the operator during tractor use; covering the battery adequately during normal use to protect it from the elements; and providing ready accessibility to the battery for easy checking and servicing. The fact that some of these considerations are conflicting only adds to the problems of tractor design.

Examples of prior battery enclosure systems and mounting arrangements include those disclosed in the following United States patents:

3,821,997 (Sieren)
4,013,136 (Fear)
3,930,552 (Kunkle et al.)
3,989,118 (Hansen)
4,074,786 (Joubert)
3,003,573 (Lorenz)
2,802,540 (Brookbank)
1,091,583 (MacGlashan)
2,607,433 (Simi)
1,678,033 (Brumbaugh)
2,158,784 (Dean)

While many of these battery enclosures and mounting arrangements have certain advantages, certain problems are present as well and there is a strong need for improvement over the prior systems.

Vehicle batteries mounted under the hood are frequently quite difficult to reach for checking of fluid levels and other servicing. Batteries mounted on various vehicle floors, such as the floor of the vehicle cab or an extension thereof, are also sometimes in the way of the operator during normal tractor use, rather inconveniently accessible for service, and/or difficult to maneuver from an enclosure into a position for service.

In many cases, vehicle structural surfaces block easy access to a battery from positions normally assumed during vehicle servicing. More specifically, in some cases, while the battery may be moved or exposed to an open position, the tractor operator or service person cannot conveniently observe fluid levels or provide service from a standing position adjacent to the vehicle. Instead, bending or climbing becomes necessary.

In some cases, while a battery enclosure may completely shield a battery from the elements, such enclosure may itself cause difficulty in making the battery easily accessible for the necessary service. While an enclosure may hold a battery, it may be rather difficult to remove the battery from the enclosure sufficiently for checking and servicing. In other cases, efforts to provide devices with good enclosure and a high degree of accessibility have resulted in battery enclosure systems which are too complex and expensive in construction.

In short, there remains a need for substantial improvement in battery enclosure systems for tractors.

OBJECTS OF THE INVENTION

It is an object of this invention to provide an improved battery enclosure system for tractors overcoming problems and shortcomings of devices of the prior art.

Another object of this invention is to provide a tractor battery enclosure system which is much more easily accessible for battery checking and servicing.

Another object of this invention is to provide a battery enclosure system which may be reached more easily for service by a service person standing on the ground beside the tractor.

Another object of this invention is to provide a tractor battery enclosure system which, while simple in construction, allows a battery to be suspended in an accessible location free from obstruction, yet completely enclosed during use and readily and completely exposed for servicing.

Another object of this invention is to provide a tractor battery enclosure system which uses a portion of the enclosure itself as a means to support the battery in a fully exposed position during servicing.

Another object of this invention is to provide a tractor battery enclosure system which, while making the battery readily accessible for service, keeps the battery completely out-of-the-way during normal vehicle operation.

These and other important objects will be apparent from the descriptions of this invention which follow.

SUMMARY OF THE INVENTION

This invention is an improved tractor battery enclosure of the type having a service opening. The tractor battery enclosure of this invention overcomes many of the problems and shortcomings of prior tractor battery installations.

The tractor battery enclosure of this invention includes means enclosing a battery use space, a suspended battery-support floor approximating the size of a battery base and having side edges and a lead edge, such floor being movable between a position beneath the battery use space and a position at least partially offset from the battery use space, and a door along the lead edge movable between a closed position and an open position which is coplanar with the floor.

This construction allows a battery to be readily moved, with the battery-support floor, from a position entirely within the battery use space to an access position at least partially offset from the battery use space, and from that point along the floor to a fully exposed service position in which the battery is at least partially supported by the door.

The door is preferably attached to the lead edge of the battery-support floor, most preferably by hinges. The battery enclosure preferably includes means affixed to the door extending beneath the floor, or to the floor extending beneath the door, to firmly support the door in the coplanar position such that when it is open it can readily support the battery.

The battery enclosing means of the preferred embodiments of this invention includes a top wall and a pair of opposed side walls depending from the top wall in spaced fashion to define the battery use space. The battery-support floor has opposed side edge portions which are adjacent to the opposed side walls. The aforementioned lead edge extends between such side walls.

The battery-support floor, which carries the door with it, is movably connected to the side walls and preferably solely supported by them. Each side wall and its adjacent side edge portion of the battery-support floor have means thereon for sliding interengagement. Such slide means preferably comprises a slot and a pin engaged in the slot. The slot is preferably in the side wall while the pin extends from the side edge portion of the floor into the slot.

The battery-support floor preferably has a main horizontal portion with the aforementioned side edge portions extending upwardly as planar members which are close to and parallel to the adjacent side walls. The aforementioned pin and slot arrangement is thus on the adjacent parallel portions of the side walls and floor side edge portions.

Such pin and slot arrangements or other sliding interengagement means are preferably positioned on the tractor battery enclosure away from the lead edge. In preferred embodiments a support bar extends between and beneath the side walls at a position below the tractor support floor. Such support bar is preferably adjacent to the lead edge such that it provides support, for the floor and the battery thereon, at a position which is spaced from the support provided by the sliding interengagement means. The extent of movement of the battery-support floor is defined by the slot and pin arrangement or other sliding interengagement means.

In the fully extended position, the floor is partially offset from the battery use space defined between the opposed side walls. If the battery is fully supported on the battery-support floor when the floor is in the fully extended position, only a degree of access to the battery top is provided. The offset portion of the floor is usually insufficient in size to support the tractor battery with its top fully exposed.

Therefore, the inside surface of the door, when the door is fully opened, is used to provide additional support surface coplanar to the floor, allowing the tractor battery to be readily pulled across the battery-support floor such that it is partially supported by the battery-support floor and partially supported by the inside surface of the door. In such position, the battery is in a full service position, its top surface being fully exposed.

Thus, the door serves not only as part of the enclosure for the battery, but as part of its support for service. This is made possible by the combination of parts described above.

The tractor battery enclosure of this invention is preferably suspended beneath a tractor structural member at a position immediately behind the built-in ladder used for gaining access to the vehicle cab. In such position, the battery is easily accessible to a service person standing on the ground beside the tractor, and no tractor structure or other members are in the way to make service inconvenient.

The battery enclosure is preferably oriented such that the battery-support floor moves in a forward direction, with respect to the tractor, as it moves into the service position.

DETAILED DESCRIPTION OF PREFERRED EMBODIMENTS

The figures show battery enclosure 10 in accordance with this invention.

Figure 2:
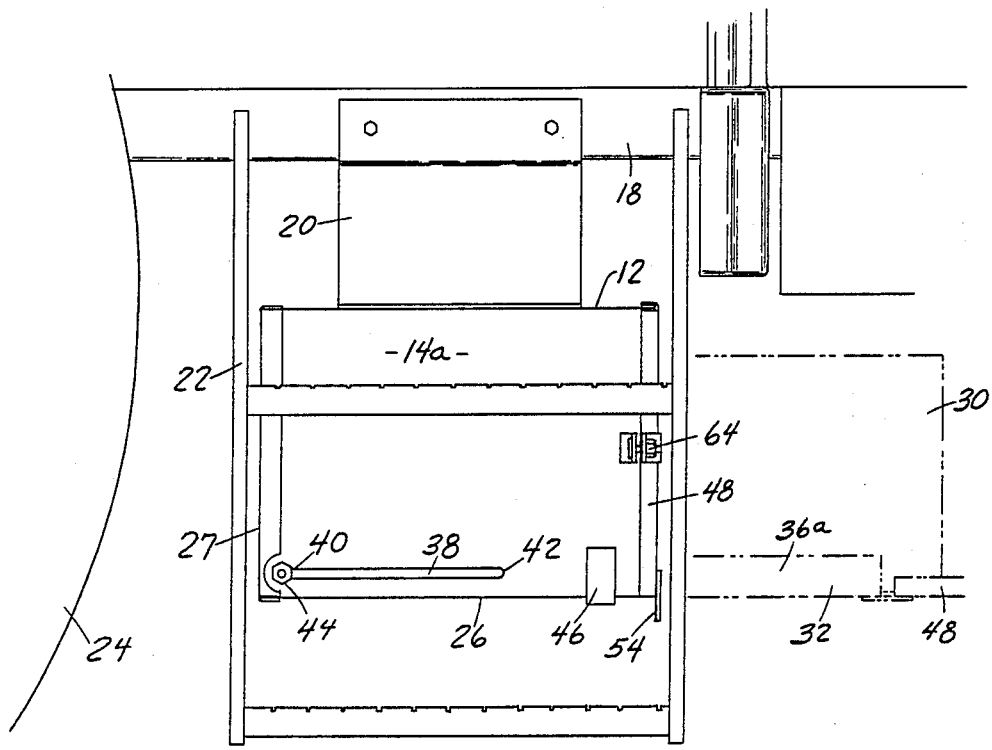
FIG. 2 is a side elevation of the device of FIG. 1 mounted in a preferred position on a tractor.

Battery enclosure 10 includes, among other things, a top wall 12 and a pair of opposed side walls 14a and 14b which are commonly formed with top wall 12 and extend downwardly from top wall along top edges 16. As illustrated in FIG. 2, battery enclosure 10 is suspended from support member 18 by a pair of hanger members 20 (only one is shown) which are bolted to support member 18 and welded to top wall 12. Battery enclosure 10 is suspended behind built-in ladder 22 in a position forward of tractor rear wheel 24.

Side walls 14a and 14b extend downwardly to bottom edges 26. Side walls 14a and 14b are parallel to each other as are bottom edges 26. Side walls 14a and 14b, top wall 12 and a rear wall 27, which is joined to top walls 12 and side walls 14a and 14b, together define a space 28 where a battery 30 is located during use. Such space is referred to herein as battery use space 28.

Top wall 12, side walls 14a and 14b, and rear wall 27 are all permanently fixed in place with respect to each other and with respect to support member 18 of the tractor. Such permanently fixed wall members define a front opening 31 and a bottom opening both of which are closed by means hereafter described.

Figure 4:
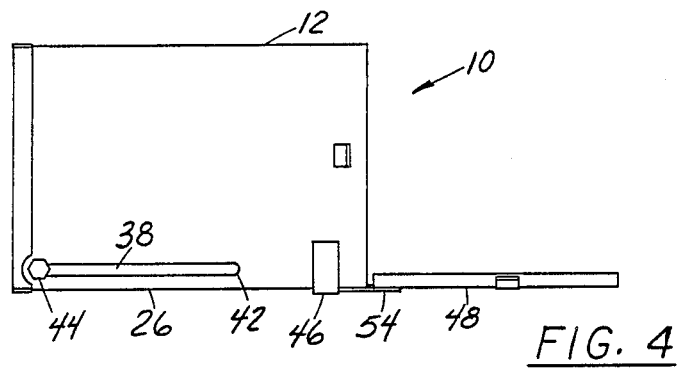
FIGS. 4-6 are reduced side elevations illustrating the device first in an open but non-use position, then in a fully extended access position with the battery partially exposed, and finally in that same position with the battery slid to a flly exposed position.
Figure 5:
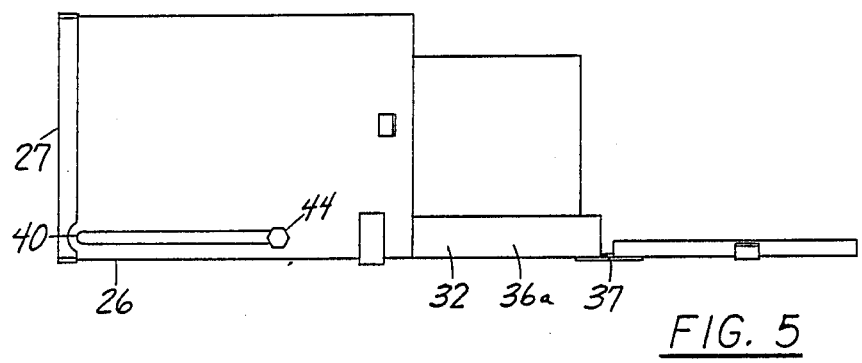
Figure 6:
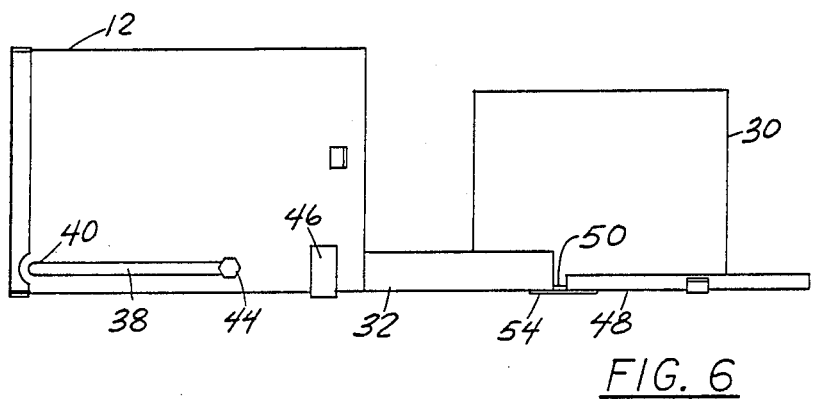

A battery-support floor 32 is suspended from and between side walls 14a and 14b. Floor 32 is movable between a position beneath battery use space 28, as shown in FIG. 4, and a position offset from battery use space 28, as shown in FIGS. 5 and 6 and by phantom lines in FIG. 2. Floor 32 includes a main portion 34, which is in a horizontal plane, a pair of opposed side edge portions 36a and 36b, which extend upwardly from horizontal main portion 34 parallel to side walls 14a and 14b respectively, and a lead edge 37 at front opening 31. Horizontal main portion 34 approximates the size of the base of battery 30 and battery 30 rests on main portion 34 between side edge portions 36a and 36b.

Slots 38 are formed in side walls 14a and 14b and extend therealong close to and parallel to bottom edges 26. Slots 38 have first ends 40 closely adjacent to rear wall 27 and second ends 42 at more forward positions which are spaced, however, a substantial distance from front opening 31. Affixed to each side edge portions 36a and 36b are support pins 44, such pins extending horizontally through slots 38 to suspend battery-support floor 32 from side walls 14a and 14b. Support pins 44 and slots 38 provide means for sliding interengagement of each side wall 14 and its adjacent side edge portion 36.

A support bar 46 is welded to and extends between side walls 14a and 14b. Support bar 46 is positioned adjacent to lead edge 37 of floor 32 and cooperates with support pins 44 and slots 38 as additional means to suspend floor 32 from side walls 14a and 14b.

Figure 1:
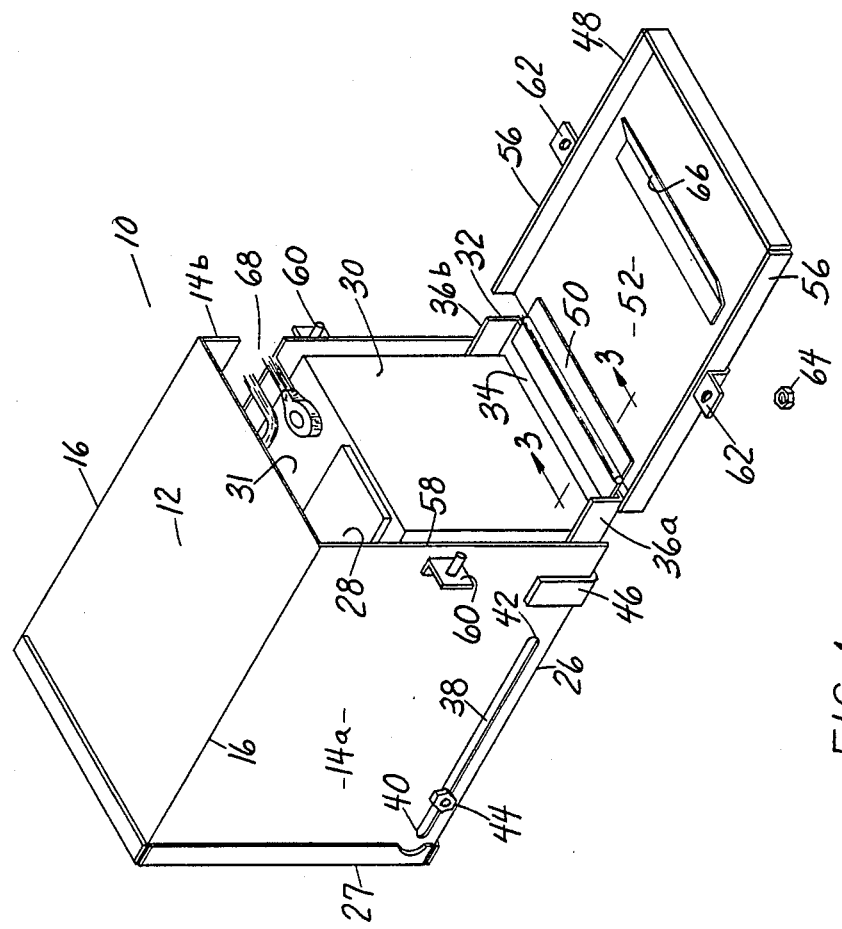
FIG. 1 is a perspective view of a tractor battery enclosure which is a preferred embodiment of this invention, with its door open and the battery-support floor being partially extended.
Figure 3:
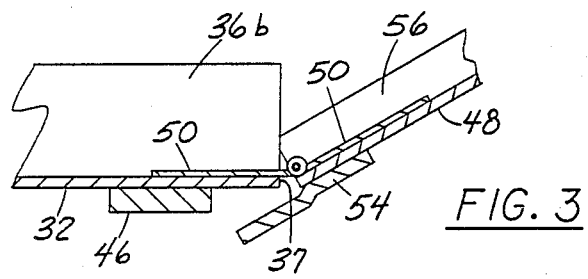
FIG. 3 is an enlarged fragmentary side sectional view taken along section 3—3 as shown in FIG. 1.

A door 48 is attached to battery-support floor 32 along lead edge 37 by a hinge 50, as illustrated best in FIGS. 1 and 3. The portions of hinge 50 are welded or otherwise secured to door 48 and lead edge 37, as shown in FIG. 1. Door 48 is movable between a closed position, illustrated by full lines in FIG. 2, and an open position, illustrated by phantom lines. The open position of door 48 is also shown in FIGS. 1 and 4-6.

Door 48 has an inner surface 52 which, when door 48 is open, is coplanar with horizontal main portion 34 of battery-support floor 32. Thus, battery 30 may easily be brought into a position of concurrent support by door 48 and floor 32, as shown in FIG. 6.

Door 48 has an outer surface to which stop plates 54 are welded. Stop plates 54 extend beyond the edge of door 48, as shown best in FIG. 3. When door 48 is in the open position, with inner surface 52 coplanar with horizontal main portion 34, stop plates 54 extend beneath and in contact with main portion 34 of battery-support floor member 32. Stop plates 54 serve to prevent any further rotation of door 48 about hinge 50 and provide firm support such that door 48 can support the heavy weight of battery 30.

Mounted along lateral edges 56 of door 48 and front edges 58 of side walls 14a and 14b are members for holding door 48 in the closed position, such that battery 30 is completely enclosed during use. These include threaded studs 60, which are secured with respect to front edges 58, tabs 62, which are secured with respect to lateral edges 56, and nuts 64, which hold these members together.

Near its top edge 16, side wall 14b forms a battery cable slot 68. Battery cable slot 68 is located on enclosure 10 at a position facilitating movement of floor 32 and battery 30.

The foregoing descriptions clearly illustrate the manner in which battery enclosure 10 of this invention operates. When it is time to check fluid levels or otherwise service battery 30, the operator or service person, while standing on the ground beside step ladder 22, simply disconnects nuts 64 from studs 60 and opens door 48 to the position shown in FIG. 4. Then, by pulling on door 48 and/or battery-support floor 32, floor 32 and battery 30 on it are moved to the position shown in FIG. 5. Then, battery 30 may be slid along battery-support floor 32 and onto inner surface 52 of door 48, such that it is in a fully exposed position for easy service by a service person standing beside built-in ladder 22.

Battery 30 may be pulled onto door 48 to any desired extent; preferably, however, it is pulled until it is in contact with retainer ledge 66, which extends inwardly and upwardly from inner surface 52. Ledge 66 also serves, when door 48 is closed, to retain battery 30 in its proper position within enclosure 10.

A number of variations are possible in this invention. Portions of the tractor structure may themselves form the top wall and even one or both of the side walls. A number of variations are possible in the sliding engagement of the floor with the side walls. Variations are possible in the door attachment and hinging apparatus. Variations are also possible in the means to firmly support the door in the coplanar position.

The device of this invention is preferably made using steel members, as is common in tractor construction. However, a wide variety of other materials may be used.

While the principles of this invention have been described in connection with specific embodiments, it should be understood clearly that these descriptions are made only by way of example and are not intended to limit the scope of the invention.

What is claimed:

1. In a combination of a tractor and tractor battery enclosure of the type having a battery service opening, the improvement comprising:
   a horizontal tractor member having a lower surface which is immediately above a void space;
   an enclosure top wall affixed with respect to the lower surface of the horizontal tractor member;
   a pair of opposed side walls depending from the top wall and defining therewith a battery use space;
   a battery-support floor having a top surface, opposed side edge portions adjacent to the opposed side walls, and a lead edge extending between the opposed side edge portions;
   means for movable attachment of the floor to the opposed side walls such that the floor is movable between a position beneath and a position at least partially offset from the battery use space;
   a door hinged to the lead edge and pivotable between a closed position and an open position, the door having an inside surface which is fully coplanar with the floor when in the open position; and
   means affixed to one of said door and floor and extending beneath the other of said door and floor to support the door in said coplanar position;
   whereby a battery may be both accesibly mounted on a tractor and readily exposed for convenient service.

2. The battery enclosure of claim 1 wherein the floor is supported solely by the side walls.

3. The battery enclosure of claim 1 wherein each side wall and the adjacent side edge portion thereof have means thereon for sliding interengagement.

4. The battery enclosure of claim 3 wherein the slide means comprises a slot and a pin engaged with the slot.

5. The battery enclosure means of claim 4 wherein the slot is in the side wall and the pin extends from the side edge portion of the floor.

6. The battery enclosure means of claim 3 wherein the floor has a main horizontal portion and the side edge portions are upwardly extending surfaces parallel to the adjacent side walls.

7. The battery enclosure of claim 6 wherein the slide means comprises a slot and a pin engaged with the slot.

8. The battery enclosure of claim 7 wherein the slot is in the side wall and the pin extends from the side edge portion of the floor.

9. The battery enclosure of claim 1 further including a support bar extending between the sidewalls beneath the floor.

10. The battery enclosure of claim 4 further including a support bar extending between the sidewalls beneath the floor, said support bar being adjacent to the lead edge.

* * * * *